(12) United States Patent
Gao et al.

(10) Patent No.: US 10,509,540 B2
(45) Date of Patent: Dec. 17, 2019

(54) METHOD AND DEVICE FOR DISPLAYING A MESSAGE

(71) Applicant: Xiaomi Inc., Beijing (CN)

(72) Inventors: Yi Gao, Beijing (CN); Hongqiang Wang, Beijing (CN); Yunyuan Ge, Beijing (CN)

(73) Assignee: XIAOMI INC., Beijing (CN)

( * ) Notice: Subject to any disclaimer, the term of this patent is extended or adjusted under 35 U.S.C. 154(b) by 739 days.

(21) Appl. No.: 15/141,813

(22) Filed: Apr. 28, 2016

(65) Prior Publication Data

US 2017/0139555 A1 May 18, 2017

(30) Foreign Application Priority Data

Nov. 17, 2015 (CN) .......................... 2015 1 0791924

(51) Int. Cl.
*G06F 3/0482* (2013.01)
*H04L 12/58* (2006.01)
(Continued)

(52) U.S. Cl.
CPC ........ *G06F 3/0482* (2013.01); *G06F 3/04842* (2013.01); *G06F 3/04845* (2013.01);
(Continued)

(58) Field of Classification Search
CPC ............... G06F 3/0482; G06F 3/04842; G06F 3/04845; H04L 65/403; H04L 51/32; H04L 51/12; H04M 1/72552; H04M 1/67
See application file for complete search history.

(56) References Cited

U.S. PATENT DOCUMENTS

2003/0187937 A1* 10/2003 Yao .......................... H04L 51/12
  709/206
2005/0134576 A1* 6/2005 Lin ...................... G06F 3/03547
  345/173

(Continued)

FOREIGN PATENT DOCUMENTS

AU 2014388249 B2 10/2015
AU 2015237224 B2 10/2015
(Continued)

OTHER PUBLICATIONS

Extended European Search Report for EP Application No. 16162301.2 dated Apr. 11, 2017.
(Continued)

*Primary Examiner* — Justin R. Blaufeld
*Assistant Examiner* — Mong-Shune Chung
(74) *Attorney, Agent, or Firm* — Jun He Law Offices P.C.; James J. Zhu (57) ABSTRACT

A method and a device for displaying a message are provided. The method includes: determining one or more screened messages; receiving a first instruction for triggering a display page to present one or more new messages, and determining one or more to-be-presented messages according to the first instruction; determining a first message of one or more to-be-presented messages as a target message, and deciding whether the target message is a screened message; and sliding the target message out of the display page if it is decided that the target message is a screened message. Accordingly, it can effectively screen contents a user is not interested in and save time for the user.

17 Claims, 9 Drawing Sheets

(51) Int. Cl.
    *H04M 1/725*     (2006.01)
    *G06F 3/0484*    (2013.01)
    *H04L 29/06*     (2006.01)
    *H04M 1/67*      (2006.01)

(52) U.S. Cl.
    CPC .............. *H04L 51/12* (2013.01); *H04L 51/32* (2013.01); *H04L 65/403* (2013.01); *H04M 1/72552* (2013.01); *H04M 1/67* (2013.01)

(56) References Cited

U.S. PATENT DOCUMENTS

| | | | | |
|---|---|---|---|---|
| 2012/0083260 | A1* | 4/2012 | Arriola | G06F 3/04883 455/418 |
| 2014/0067975 | A1 | 3/2014 | Ding et al. | |
| 2014/0143683 | A1 | 5/2014 | Underwood, IV et al. | |
| 2014/0189585 | A1* | 7/2014 | Brush | B60R 16/023 715/808 |
| 2015/0281155 | A1 | 10/2015 | Cue et al. | |
| 2015/0281156 | A1* | 10/2015 | Beausoleil | H04L 51/14 709/206 |
| 2016/0065517 | A1 | 3/2016 | Beausoleil et al. | |
| 2017/0302603 | A1 | 10/2017 | Cue et al. | |

FOREIGN PATENT DOCUMENTS

| | | |
|---|---|---|
| AU | 2017200012 A1 | 2/2017 |
| CN | 101674294 A | 3/2010 |
| CN | 102147690 A | 8/2011 |
| CN | 102404239 A | 4/2012 |
| CN | 102405462 A | 4/2012 |
| EP | 3123349 A1 | 2/2017 |
| EP | 3123421 A1 | 2/2017 |
| JP | 2010049496 A | 3/2010 |
| JP | 2011022811 A | 2/2011 |
| JP | 2013092865 A | 5/2013 |
| JP | 2014219708 A | 11/2014 |
| JP | 2017514332 A | 6/2017 |
| JP | 2017515181 A | 6/2017 |
| KR | 20140126633 A | 10/2014 |
| KR | 20150105024 A | 9/2015 |
| RU | 2644533 C2 | 2/2018 |
| WO | 2015147926 A1 | 10/2015 |
| WO | 2015149025 A1 | 10/2015 |

OTHER PUBLICATIONS

International Search Report for PCT Application No. PCT/CN2015/099724 dated Jul. 26, 2016.
First Office Action of No. MX/a/2016/004270.
International Search Report for PCT/CN2015/099724.

* cited by examiner

METHOD AND DEVICE FOR DISPLAYING A MESSAGE

CROSS-REFERENCE TO RELATED APPLICATIONS

The present application is based upon and claims priority to Chinese Patent Application No. 201510791924.2, filed Nov. 17, 2015, the entire contents of which are incorporated herein by reference.

TECHNICAL FIELD

The present disclosure generally relates to the field of display technology, and more particularly, to a method and a device for displaying a message.

BACKGROUND

With rapid development of technology, more and more people have become users of various terminals. Users of terminals can acquire messages through terminals. For example, through applications installed in the terminal, such as Microblog or Wechat, to receive messages.

A message may be forwarded by many users due to its interesting content. Accordingly, a user may receive a same message forwarded by different people at different instants. In addition, in "Friends' Circle" of Wechat (a function of the application Wechat, which allowes the user to share his own posters with friends and to get access to the friends' information), many friends are doing business and publishing commercial advertisements. It is a problem that the user can neither block theses friends out of his "Friends' Circle" in view of their friendship nor choose not to check the "Friends' Circle".

SUMMARY

According to a first aspect of embodiments of the present disclosure, there is provided a method for displaying a message, which is implemented by a terminal or a server, the method, including: determining one or more screened messages; receiving a first instruction for triggering a display page to present one or more new messages, and determining one or more to-be-presented messages according to the first instruction; determining a first message of one or more to-be-presented messages as a target message, and deciding whether the target message is a screened message; and sliding the target message out of the display page if it is decided that the target message is a screened message.

According to a second aspect of embodiments of the present disclosure, there is provided a device for displaying a message, including: a processor; and a memory for storing instructions executable by the processor; wherein the processor is configured to perform: determining one or more screened messages; receiving a first instruction for triggering a display page to present one or more new messages, and determining one or more to-be-presented messages according to the first instruction; determining a first message of one or more to-be-presented messages as a target message, and deciding whether the target message is a screened message; and sliding the target message out of the display page if it is decided that the target message is a screened message.

According to a third aspect of the embodiment of the present disclosure, there is provided a non-transitory computer-readable storage medium storing instructions, executable by a processor of a terminal or a server, causes the terminal or the sever to perform a method for displaying a message, the method including: determining one or more screened messages; receiving a first instruction for triggering a display page to present one or more new messages, and determining one or more to-be-presented messages according to the first instruction; determining a first message of one or more to-be-presented messages as a target message, and deciding whether the target message is a screened message; and sliding the target message out of the display page if it is decided that the target message is a screened message.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

First of all, some terms involved in the embodiments of the present disclosure are defined.

A display screen, also referred to as a screen, is an electronic device for displaying images and colors. A user can view a current display page on the display screen.

A new message is a message emerging after the current display page is changed, which has never been displayed previously. There may be one or more new messages. Even if the one or more messages have the same contents with one or more messages that have been displayed in the current display page, the one or more messages are considered as new messages, as long as the one or more messages have never been displayed in the current display page. For example, a message A is displayed on the current display page, and then the user performs a sliding operation on the display page to display another message B. Even if the message B has the same content with the message A, the message B displayed after the user performs the sliding operation is considered as one of new messages.

A to-be-presented message is a new message to be displayed.

Figure 1:
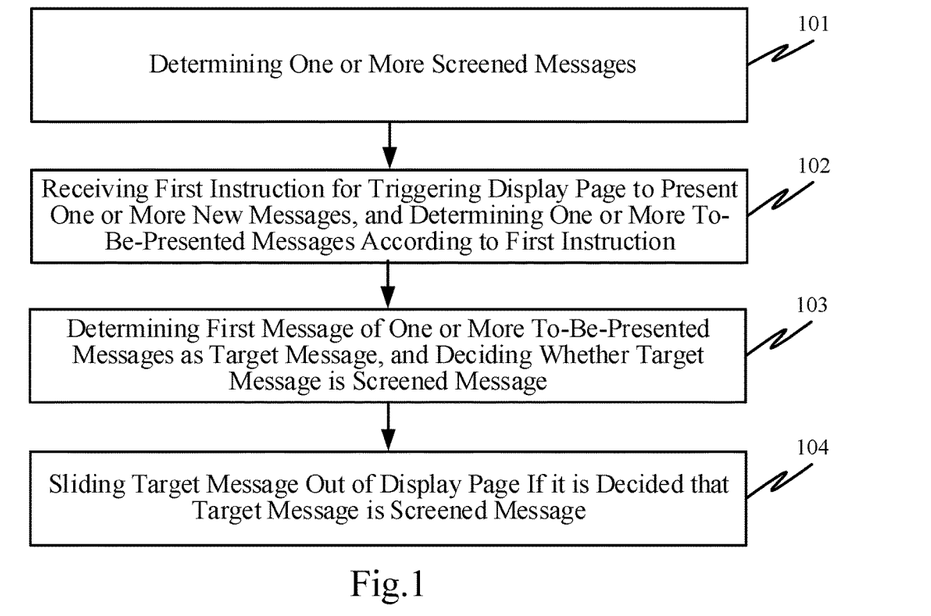
FIG. 1 is a flow chart illustrating a method for displaying a message according to an exemplary embodiment.

FIG. 1 is a flow chart illustrating a method for displaying a message according to an exemplary embodiment, which is performed by a message displaying device. The method for displaying a message of the present embodiment is implemented by a terminal or a server. As shown in FIG. 1, the method includes the following steps.

In step S101, one or more screened messages are determined.

A screened message can be defined by the user. For example, a corresponding screened message can be determined from a current display page of a display screen. Messages on the current display page are messages the user can currently see from the display screen.

Specifically, as an example, the user can determine a screened message corresponding to the current display page with a mouse. If the display screen is a touch screen, the user can also determine a screened message in the display page by touching the display screen and other operations. For example, a screened message can be determined through preset operations such as a mouse hovering on a displayed message for a time period exceeding a preset threshold, clicking on a preset button, sliding along a preset track and the like. Sliding along a preset track can be, for example, sliding leftward or rightward on the display screen. When the display screen is a touch screen, the user determines a screened message through the above operations with his finger instead of the mouse. Each message has a unique identification for identifying the screened message. That is, if an identification of a message is the same with an identification of a screened message, the message can be determined as a screened message. However, it can be determined whether a new message is a screened message based on similarity between contents of the new message and contents of the screened message.

In addition to the above manners for the user to determine a screened message, there are other manners for the message displaying device to learn to determine a screened message. For example, optionally, a reading frequency or a reading time duration of the user with respect to each preset type of messages is counted, and a type of message which has a reading frequency or a reading time duration less than a preset threshold is determined as a screened message. For example, according to the counting, the user is not interested in certain type of message, and each time the user comes across that type of message, the user generally does not check the message. In this case, this type of message can be defined as a screened message. Specifically, types of message can be determined based on topics, contents or publisher of the messages. For another example, when it is recognized that the user stays at certain message for a time duration less than a preset threshold such as 2 seconds, it can be determined that the user is not interested in the message, and the message can be determined as a screened message. The manners for determining a screened message can be set depending on practical applications, which will not be described in detail herein.

In step S102, a first instruction for triggering a display page to present one or more new messages is received, and one or more to-be-presented messages are determined according to the first instruction.

As an example, a user can send to the message displaying device a first instruction for presenting one or more new messages with a mouse or by touching the touch screen. One or more new messages will be presented, for example, by sliding the current display page up and down with the mouse wheel, or by the user's touching the touch screen and sliding the current display page up and down. There can be one or more pieces of new messages. The one or more new messages displayed can be determined as to-be-presented messages according to the first instruction.

In step S103, a first message of one or more to-be-presented messages is determined as a target message, and it is decided whether the target message is a screened message.

As an example, according to the first instruction, a first message to be presented is determined as the target message. Since the first instruction may contain a sliding distance and a sliding direction of the display page, it can be learned from the first instruction that which one or more messages are determined as to-be-presented messages. Specifically, it can be determined whether the target message is the screened message according to whether the identification of the target message is the same with the identification of the screened message.

In step S104, the target message is slid out of the display page if it is decided that the target message is a screened message.

Sliding the target message out of the display page means that the target message that would otherwise be displayed on the display page is automatically removed from the display page. For example, according to a distance for sliding the page in the first instruction, the target message should be displayed on the display page. However, after the message displaying device recognized the target message as the screened message, the page will be automatically slid upward or downward to remove the target message out of the display page. If it is decided that the target message is not the screened message, all new messages will be presented normally according to the first instruction.

Optionally, after step S104, the method further includes: updating a second message of one or more to-be-presented messages to be the target message, and deciding whether the target message is a screened message, and presenting the target message on the display page if it is decided that the target message is not a screened message.

Since more than one new message can be displayed according to the same first instruction, the more than one to-be-presented message can be determined one by one as whether being a screened message, until a to-be-presented message is found to be a non-screened message. Then, the to-be-presented message is displayed.

According to the method for displaying a message in the present embodiment, one or more screened messages are determined, and when a first message of one or more to-be-presented messages is a screened message, the first message is automatically slid out of the display screen, so that the first message will not be seen by the user. Thereby, it can effectively screen out contents not interesting to the user, and can thus save time for the user. Different from shielding messages, the method for displaying a message in the present embodiment will not lose a message.

Figure 2:
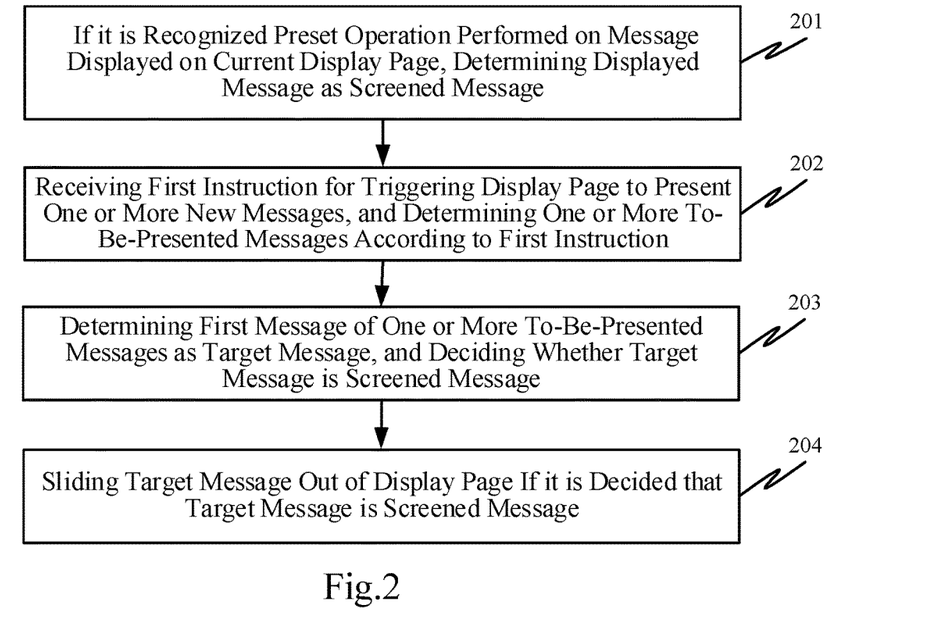
FIG. 2 is a flow chart illustrating a method for displaying a message according to another exemplary embodiment.

FIG. 2 is a flow chart illustrating a method for displaying a message according to another exemplary embodiment, which is performed by a message displaying device. The method for displaying a message of the present embodiment is implemented by a terminal or a server. As shown in FIG. 2, the method includes the following steps.

In step S201, if it is recognized a preset operation performed on a message displayed on a current display page, the displayed message is determined as a screened message.

Specifically, as an example, the user can determine a screened message in the display page with a mouse. If the display screen is a touch screen, the user can also determine a screened message in the display page by touching the display screen and other operations. For example, a screened message can be determined through preset operations such as a mouse hovering on a displayed message for a time period exceeding a preset threshold, clicking on a preset button, sliding along a preset track and the like. Sliding along a preset track can be for example, sliding leftward or rightward on the display screen. When the display screen is a touch screen, the user determines a screened message through the above operations with his finger instead of the mouse. Each message has a unique identification for identifying the screened message. That is, if an identification of a message is the same with an identification of a screened message, the message can be determined as a screened message. However, it can be determined whether a new message is a screened message based on similarity between contents of the new message and contents of the screened message.

In addition, step 201 can be replaced with: counting a reading frequency or a reading time duration of a user with respect to each preset type of messages; and determining a type of message which has a reading frequency or a reading time duration less than a preset threshold as a screened message.

Therefore, in addition to the above manners for a user to define a screened message, there are other manners for the message displaying device to learn to determine a screened message. For example, according to the counting, the user is not interested in a certain type of message, and each time the user comes across that type of message, the user generally does not check the message. In this case, this type of message can be defined as a screened message. Specifically, types of messages can be determined based on topics, contents or publisher of the messages. For another example, when it is recognized that a user stays at a certain message for a time duration less than a preset threshold, it can be determined that the user is not interested in the message, and the message can be taken as a screened message. The manners for determining a screened message can be set depending on practical applications, which will not be described in detail herein.

In addition, in the present embodiment, determining the displayed message as a screened message can include: storing an identification of the displayed message in a preset screened-message list.

Since each displayed message has a unique identification, after the identification is stored in the screened-message list, it can be determined whether a target message is a screened message by deciding whether the identification of the target message is in the screened-message list.

In step S202, a first instruction for triggering a display page to present one or more new messages is received, and one or more to-be-presented messages are determined according to the first instruction.

As an example, a user can send to the message displaying device an instruction for presenting one or more new messages with a mouse or by touching the touch screen. One or more new messages will be presented, for example, by sliding the current display page up and down with the mouse wheel, or by the user's touching the touch screen and sliding the current display page up and down. There can be one or more pieces of new messages. The one or more new messages displayed can be determined as to-be-presented messages according to the first instruction.

In step S203, a first message of one or more to-be-presented messages is determined as a target message, and it is decided whether the target message is a screened message.

As an example, according to the first instruction, a first message to be presented is determined as the target message. Since the first instruction may contain a sliding distance and a sliding direction of the display page, it can be learned from the first instruction which one or more messages are determined as to-be-presented messages. Specifically, it can be determined whether the target message is a screened message according to whether the identification of the target message is the same with the identification of a screened message.

In step S204, the target message is slid out of the display page if it is decided that the target message is a screened message.

Sliding the target message out of the display page means that the target message that would otherwise be displayed on the display page is automatically removed from the display page. For example, according to a distance for sliding the page in the first instruction, the target message should be displayed on the display page. However, after the message displaying device recognized the target message as a screened message, the page will be automatically slid upward or downward to remove the target message out of the display page. If it is decided that the target message is not a screened message, all new messages will be presented normally according to the first instruction.

Optionally, after step S204, the method further includes: updating a second message of one or more to-be-presented messages to be the target message, and deciding whether the target message is a screened message, and presenting the target message on the display page if it is decided that the target message is not a screened message.

Since more than one new message can be displayed according to the same first instruction, the more than one to-be-presented message can be determined one by one as whether being a screened message, until a to-be-presented message is found to be a non-screened message. Then, the to-be-presented message is displayed.

According to the method for displaying a message in the present embodiment, after a screened message is recognized, the identification of the screened message is stored in the screened-message list. Then it can be decided whether a first message of one or more to-be-presented messages is a screened message by determining whether an identification of the first message is in the screened-message list. If it is decided that the first message is in a screened message, the first message is automatically slid out of the display screen, so that the first message will not be seen by the user. Thereby, it can effectively screen out contents not interested by the user, and can thus save time for the user. Different from shielding messages, the method for displaying a message in the present embodiment will not lose a message.

Figure 3:
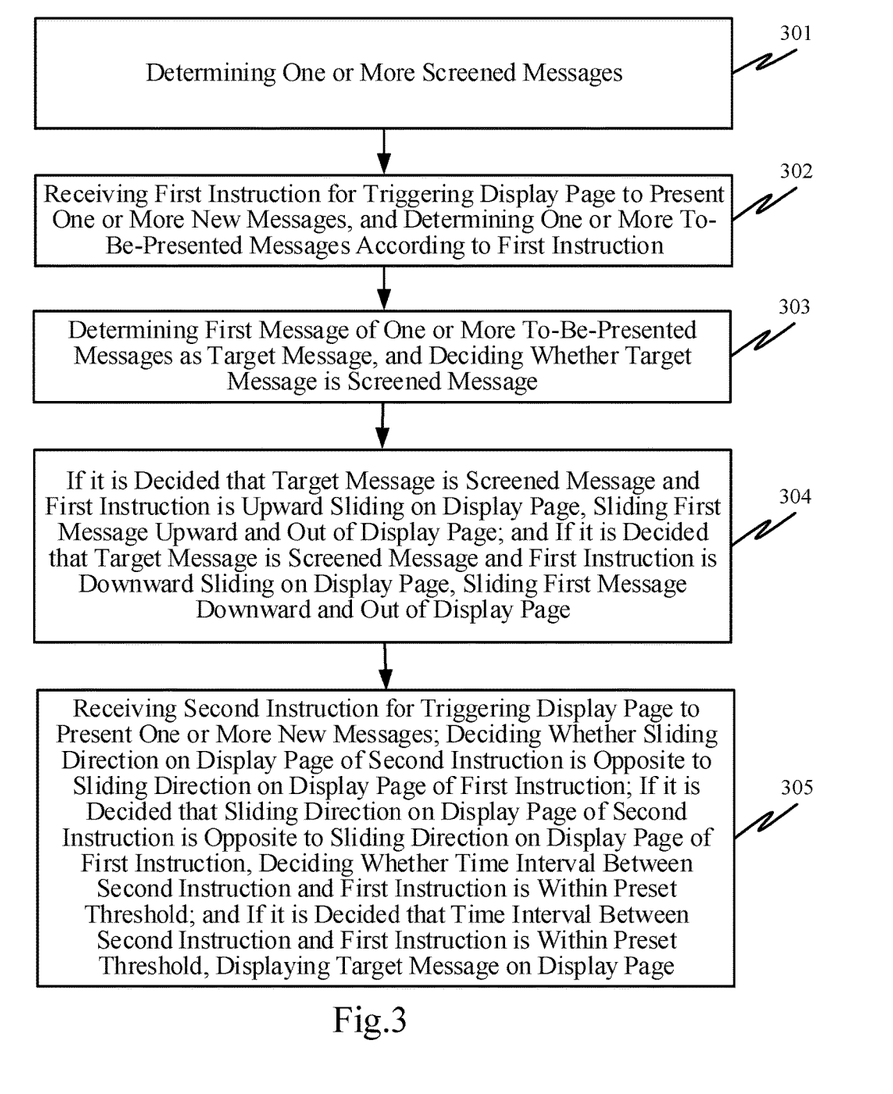
FIG. 3 is a flow chart illustrating a method for displaying a message according to another exemplary embodiment.

FIG. 3 is a flow chart illustrating a method for displaying a message according to another exemplary embodiment, which is performed by a message displaying device. The method for displaying a message of the present embodiment is implemented by a terminal or a server. As shown in FIG. 3, the method includes the following steps.

In step S301, one or more screened messages are determined.

A screened message can be defined by the user. For example, a corresponding screened message can be determined from a current display page of a display screen.

Messages on the current display page are messages the user can currently see from the display screen.

Specifically, as an example, the user can determine a screened message corresponding to the current display page with a mouse. If the display screen is a touch screen, the user can also determine a screened message in the display page by touching the display screen and other operations. For example, a screened message can be determined through preset operations such as a mouse hovering on a displayed message for a time period exceeding a preset threshold, clicking on a preset button, sliding along a preset track and the like. Sliding along a preset track can be for example, sliding leftward or rightward on the display screen. When the display screen is a touch screen, the user determines a screened message through the above operations with his finger instead of the mouse. Each message has a unique identification for identifying the screened message. That is, if an identification of a message is the same with an identification of a screened message, the message can be determined as a screened message. However, it can be determined whether a new message is a screened message based on similarity between contents of the new message and contents of the screened message.

In addition to the above manners for a user to define a screened message, there are other manners for the message displaying device to learn to determine a screened message. For example, optionally, a reading frequency or a reading time duration of a user with respect to each preset type of messages is counted, and a type of message which has a reading frequency or a reading time duration less than a preset threshold is determined as a screened message. For example, according to the counting, the user is not interested in certain type of message, and each time the user comes across the type of message, the user generally does not check the message. In this case, this type of message can be defined as a screened message. Specifically, types of messages can be determined based on topics, contents or publisher of the messages. For another example, when it is recognized that a user stays at a certain message for a time duration less than a preset threshold such as 2 seconds, it can be determined that the user is not interested in the message, and the message can be taken as a screened message. The manners for determining a screened message can be set depending on practical applications, which will not be described in detail herein.

In step S302, a first instruction for triggering a display page to present one or more new messages is received, and one or more to-be-presented messages are determined according to the first instruction.

As an example, a user can send to the message displaying device a first instruction for triggering the display page to present one or more new messages with a mouse or by touching the touch screen. One or more new messages will be presented, for example, by sliding the current display page up and down with the mouse wheel, or by the user's touching the touch screen and sliding the current display page up and down. There can be one or more pieces of new messages. The one or more new messages displayed can be determined as to-be-presented messages according to the first instruction.

In step S303, a first message of one or more to-be-presented messages is determined as a target message, and it is decided whether the target message is a screened message.

As an example, according to the first instruction, a first message to be presented is determined as the target message. Since the first instruction may contain a sliding distance and a sliding direction of the display page, it can be learned from the first instruction which one or more messages are determined as to-be-presented messages. Specifically, it can be determined whether the target message is a screened message according to whether the identification of the target message is the same with the identification of a screened message.

In step S304, if it is decided that the target message is a screened message and the first instruction is an upward sliding on the display page, a first message is slid upward and out of the display page; and if it is decided that the target message is a screened message and the first instruction is a downward sliding on the display page, a first message is slid downward and out of the display page.

Sliding the target message out of the display page means that the target message that would otherwise be displayed on the display page is automatically removed from the display page. For example, according to a distance for sliding the page in the first instruction, the target message should be displayed on the display page. However, after the message displaying device recognized the target message as a screened message, the page will be automatically slid upward or downward to remove the target message out of the display page. If it is decided that the target message is not a screened message, all new messages will be presented normally according to the first instruction.

In step 305, a second instruction for triggering the display page to present one or more new messages is received. It is decided whether a sliding direction on the display page of the second instruction is opposite to a sliding direction on the display page of the first instruction. If it is decided that the sliding direction on the display page of the second instruction is opposite to the sliding direction on the display page of the first instruction, it is decided whether a time interval between the second instruction and the first instruction is within a preset threshold. If it is decided that the time interval between the second instruction and the first instruction is within the preset threshold, the target message is displayed on the display page.

As an example, sometimes, even if the user has already taken some messages are screened messages, the user needs to check the messages over a time or due to other consideration. In this case, after the user sees these messages, the user may want to browse them for another time. While according to the method for displaying a message in the present embodiment, when the user slides the display page to display new messages, a screened message will be normally displayed but automatically slid out of the display page. During this process, the user can see part of the contents of the screened message. At this time, if the user gets interested in the screened message or just needs the screened message, the user may immediately slide the display page in an opposite direction. Then, the screened message will be displayed on the display page again. Thus, the time interval between the first instruction and the second instruction will be very short. Accordingly, if the time interval is within a preset threshold, it can be decided that the user wants to browse the screened message again, and then the target message, i.e. the screened message will be displayed on the screen.

In the present embodiment, the preset threshold can be set depending on practical applications, such as 1 second, 2 seconds, etc.

Optionally, after step S304, the method further includes: updating a second message of one or more to-be-presented messages to be the target message, deciding whether the target message is a screened message, and presenting the target message on the display page if it is decided that the target message is not a screened message.

Since more than one new message can be displayed according to the same first instruction, the more than one to-be-presented message can be determined one by one as whether being a screened message, until a to-be-presented message is found to be a non-screened message. Then, the to-be-presented message is displayed.

According to the method for displaying a message in the present embodiment, one or more screened messages are determined. When a first message of one or more to-be-presented messages is a screened message, the first message is automatically slid out of the display page, so that the first message will not be seen by the user. Thereby, it can effectively screen out contents not interested by the user, and can thus save time for the user. Moreover, if the user wants to check a screened message, the user only has to slide the display page in the opposite direction, which considerably facilitates the user operation.

Hereinafter, the above method for displaying a message will be described in detail with reference to an example. In the present embodiment, the display screen is a touch screen and the user can touch the display screen with his finger to send a control instruction.

Figure 4A:
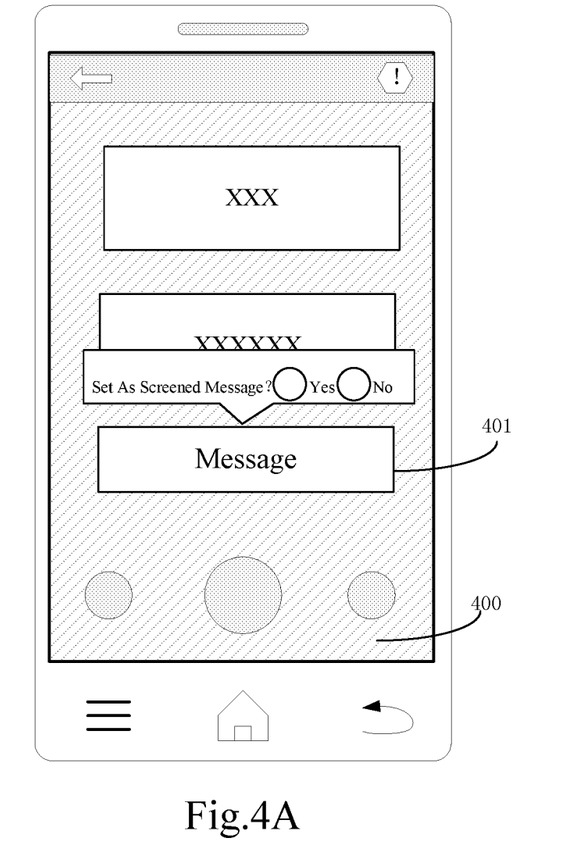
FIGS. 4A-4E are schematic diagrams of a display page in steps of a method for displaying a message according to an exemplary embodiment.

As shown in FIG. 4A, a display screen 400 is a current display page, and a message 401 has been identified as a screened message by the user. Specifically, the user performs a long press on the message 401, and a box as shown in FIG. 4A is displayed. There is an option "Set as Screened Message" in the box. If the user selects yes, the message displaying device adds the identification of the message 401 to a preset screened-message list.

Figure 4B:
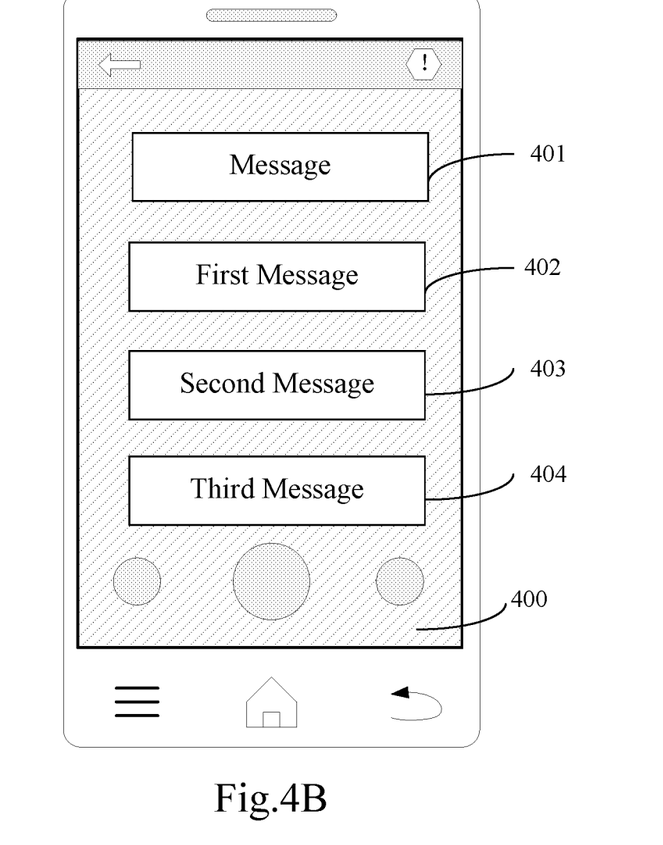
Figure 4C:
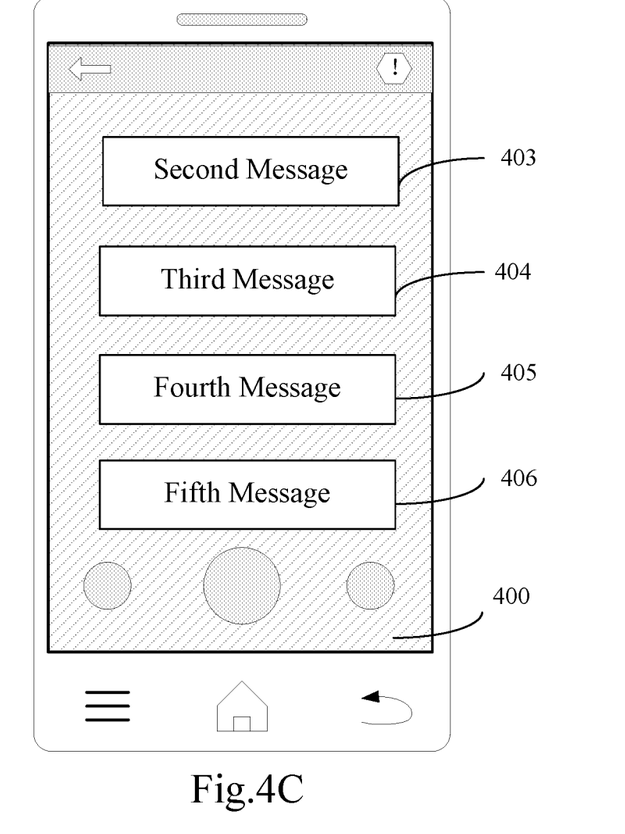

As shown in FIG. 4B, the user slides the display page upward, and messages displayed according to the sliding distance includes 4 messages. A first message 402 of the to-be-presented messages is the target message. It is assumed that the first message 402 is a screened message. Even if according to the first instruction sent by the user, the page will be slid upward for a distance of 5 cm, and the length of the display screen 400 is 10 cm, the message displaying device will automatically keep sliding the page upward until the first message 402 is slid out of the page. At this time, a second message 403 which is newly presented is on top of the display screen 400, as shown in FIG. 4C.

Figure 4D:
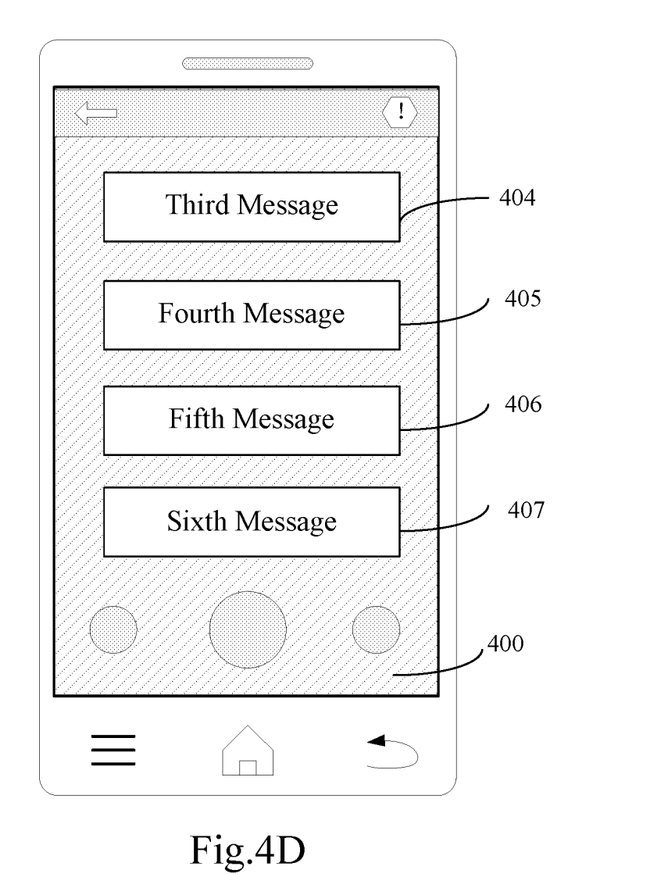

As shown in FIG. 4D, the message displaying device decides whether the second message 403 is a screened message. If it is decided that the second message 403 is a screened message, the message displaying device will automatically keep sliding the page upward until the second message 403 is slid out of the page. At this time, a third message 404 which is newly presented is on top of the display screen 400. It should be noted that, deciding whether the second message 403 is a screened message can be performed immediately after the step of deciding whether the first message 402 is a screened message. Thus, it can be observed that the first message 402 and the second message 403 are slid out of the display page one by one successively. It is decided that the third message 404 is not a screened message, therefore, the third message 404 is displayed on the display screen 400. Thus, even if the fourth message 405 which is newly presented is a screened message, the fourth message 405 is normally displayed on the display page, so as to keep the completeness of the message list. In this way, the user can determine whether to check the screened messages again depending on the practical situation. However, since the first message 402 and the second message 403 are both slid upward and out of the display page, the fifth message 406 and the sixth message 407 are displayed too. That is, although the user sends the first instruction to move the display page upward for a distance of 5 cm, according to the method for displaying a message of the present embodiment, the display page will be moved upward for a distance exceeding 5 cm.

Figure 4E:
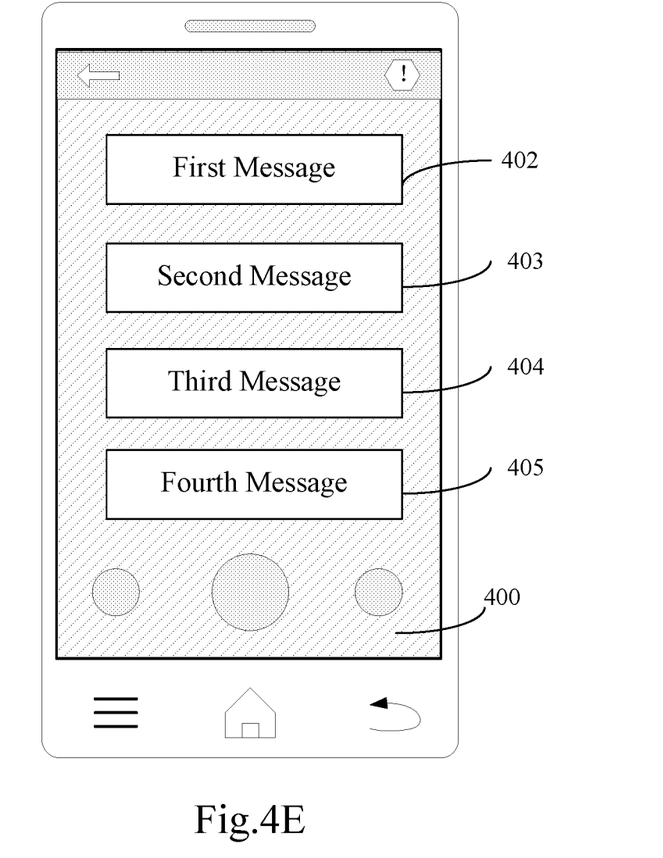

It is assumed that before the second message 403 is slid out of the display page, the user quickly browses relevant contents of the second message 403 and he wants to check the second message 403 for another time, and the user slides the page downward to display the second message 403. The message displaying device decides that a time interval between the first instruction and the second instruction is 2 seconds which does not exceed the preset threshold. Then, if the new message includes 1 message according to the second instruction, the 1 message will be displayed on the display page. That is, the second message 403 will be displayed on top of the display screen 400. Alternatively, as shown in FIG. 4E, if there are two new messages according to the second instruction, the two messages will be displayed on the display page. That is, both of the second message 403 and the first message 402 will be displayed on the display page.

Figure 5:
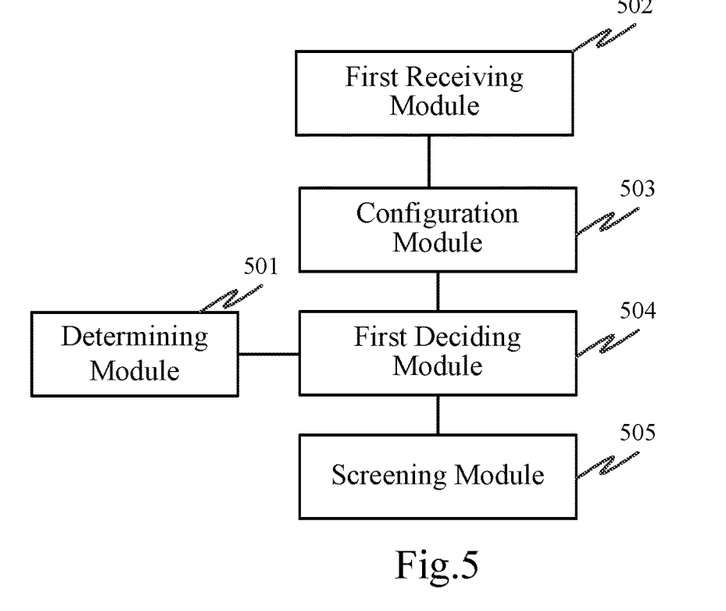
FIG. 5 is a block diagram of a device for displaying a message according to an exemplary embodiment.

FIG. 5 is a block diagram of a device for displaying a message according to an exemplary embodiment. As shown in FIG. 5, the device includes: a determining module 501, a first receiving module 502, a configuration module 503, a first deciding module 504 and a screening module 505.

The determining module 501 is configured to determine one or more screened messages; the first receiving module 502 is configured to receive a first instruction for triggering a display page to present one or more new messages, and determine one or more to-be-presented messages according to the first instruction; the configuration module 503 is configured to determine a first message of one or more to-be-presented messages as a target message; the first deciding module 504 is configured to decide whether the target message is a screened message, and if it is decided that the target message is a screened message, a screening module is triggered; and the screening module 505 is configured to slide the target message out of the display page.

Optionally, the configuration module 503 is configured to update a second message of one or more to-be-presented messages to be the target message, and decide whether the target message is a screened message, if it is decided that the target message is not a screened message, and present the target message on the display page. The configuration module 503 is further configured to store an identification of the message in a preset screened-message list.

Optionally, the determining module 501 of the present embodiment is configured to: determine the displayed message as a screened message if it is recognized a preset operation performed on a message displayed on a current display page. The determining module 501 is further configured to: count a reading frequency or a reading time duration of a user with respect to each preset type of messages; and determine a type of message which has a reading frequency or a reading time duration less than a preset threshold as a screened message.

Optionally, the preset operation includes at least one of the following operations: hovering on the displayed message for a time period exceeding a preset threshold, clicking a preset button, and sliding along a preset track.

Optionally, the screening module 505 is configured to: slide the target message upward and out of the display page if it is decided that the target message is a screened message and the first instruction for presenting a new message is an upward sliding on the display page; and slide the target message downward and out of the display page if it is decided that the target message is a screened message and the first instruction for presenting a new message is a downward sliding on the display page.

With respect to the device in the above embodiment, the specific manners for performing operations for individual modules therein have been described in detail in the embodiments regarding the relevant method, which will not be elaborated herein.

According to the device for displaying a message of the present embodiment, one or more screened messages are determined, and when a first message of one or more to-be-presented messages is a screened message, the first message is automatically slid out of the display screen, so that the first message will not be seen by the user. Thereby, it can effectively screen out contents not interested by the user, and can thus save time for the user. Different from shielding messages, the method for displaying a message in the present embodiment will not lose a message.

Figure 6:
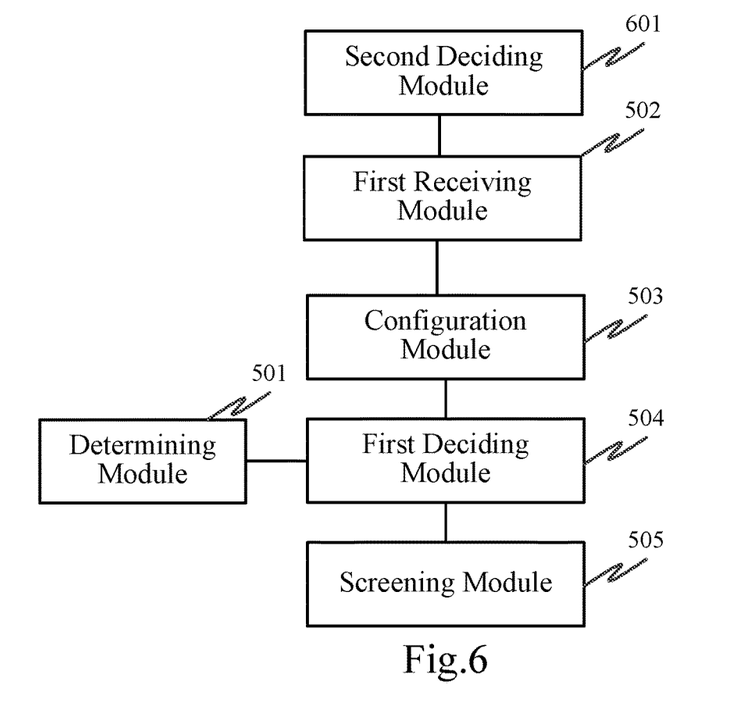
FIG. 6 is a block diagram of a device for displaying a message according to another exemplary embodiment.

FIG. 6 is a block diagram of a device for displaying a message according to another exemplary embodiment. As shown in FIG. 6, the device includes a determining module 501, a first receiving module 502, a configuration module 503, a first deciding module 504 and a screening module 505. The device further includes a second deciding module 601 configured to: receive a second instruction for triggering the display page to present one or more new messages; decide whether a sliding direction on the display page of the second instruction is opposite to a sliding direction on the display page of the first instruction; if it is decided that the sliding direction on the display page of the second instruction is opposite to the sliding direction on the display page of the first instruction, decide whether a time interval between the second instruction and the first instruction is within a preset threshold; and if it is decided that the time interval between the second instruction and the first instruction is within the preset threshold, display the target message on the display page.

With respect to the device in the above embodiment, the specific manners for performing operations for individual modules therein have been described in detail in the embodiments regarding the relevant method, which will not be elaborated herein.

According to the device for displaying a message in the present embodiment, one or more screened messages are determined, and when a first message of one or more to-be-presented messages is a screened message, the first message is automatically slid out of the display page, so that the first message will not be seen by the user. Thereby, it can effectively screen out contents not interested by the user, and can thus save time for the user. Moreover, if the user wants to check a screened message, the user only has to slide the display page in the opposite direction, which considerably facilitates the user operation.

Figure 7:
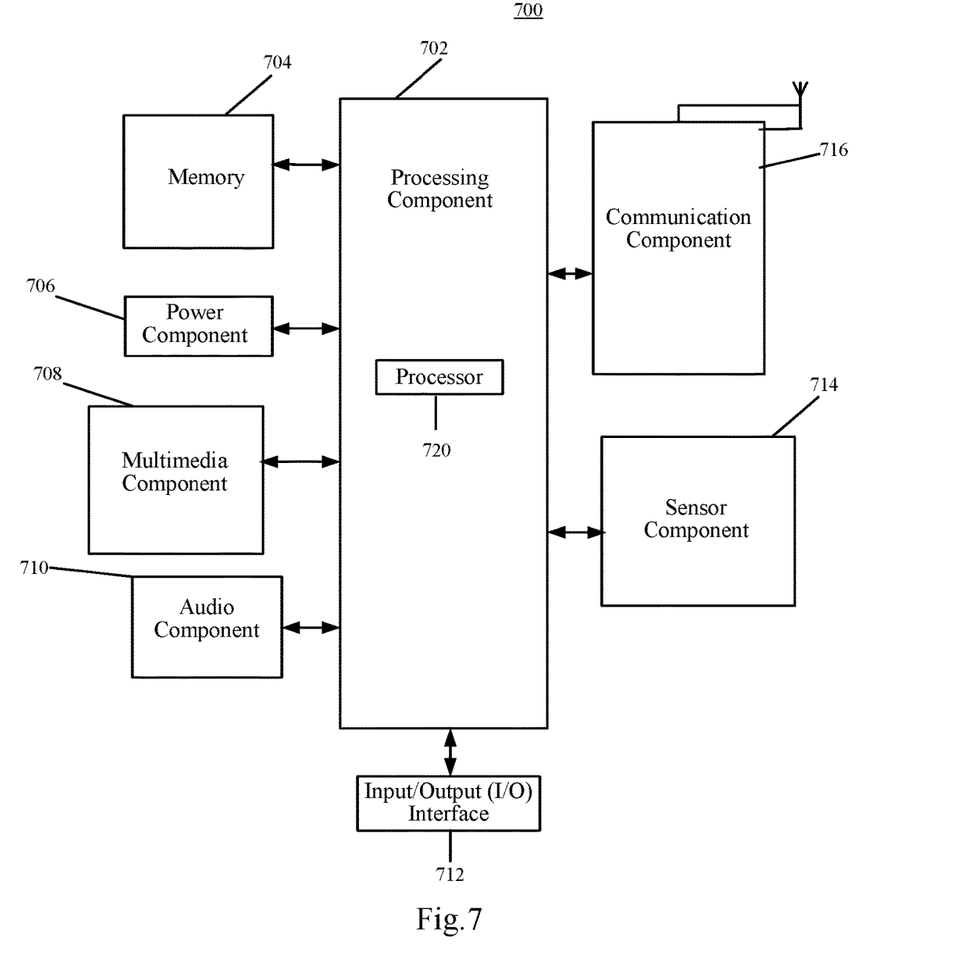
FIG. 7 is a block diagram of a device for displaying a message according to another exemplary embodiment.

FIG. 7 is a block diagram of a device 700 for displaying a message according to an exemplary embodiment. For example, the device 700 can be a mobile phone, a computer, a digital broadcast terminal, a messaging device, a gaming console, a tablet, a medical device, exercise equipment, a personal digital assistant, and the like.

Referring to FIG. 7, the device 700 can include one or more of the following components: a processing component 702, a memory 704, a power component 706, a multimedia component 707, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 can include one or more processors 720 to execute instructions to perform all or part of the steps in the above described methods. Moreover, the processing component 702 can include one or more modules which facilitate the interaction between the processing component 702 and other components. For instance, the processing component 702 can include a multimedia module to facilitate the interaction between the multimedia component 707 and the processing component 702.

The memory 704 is configured to store various types of data to support the operation of the device 700. Examples of such data include instructions for any applications or methods operated on the device 700, contact data, phonebook data, messages, pictures, video, etc. The memory 704 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the device 700. The power component 706 can include a power management system, one or more power sources, and any other components associated with the generation, management, and distribution of power in the device 700.

The multimedia component 707 includes a screen providing an output interface between the device 700 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 707 includes a front camera and/or a rear camera. The front camera and the rear camera can receive an external multimedia datum while the device 700 is in an operation mode, such as a photographing mode or a video mode. Each of the front camera and the rear camera can be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal can be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like.

The buttons can include, but are not limited to, a home button, a volume button, a starting button, and a locking button.

The sensor component 714 includes one or more sensors to provide status assessments of various aspects of the device 700. For instance, the sensor component 714 can detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 714 can include a proximity sensor configured to detect the presence of nearby objects without any physical contact. The sensor component 714 can also include a light sensor, such as a CMOS or CCD image sensor, for use in imaging applications. In some embodiments, the sensor component 714 can also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G; or 3G; or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 700 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 704, executable by the processor 720 in the device 700, for performing the above-described methods. For example, the non-transitory computer-readable storage medium can be a ROM, a RAM, a CD-ROM, a magnetic tape, a floppy disc, an optical data storage device, and the like.

A non-transitory computer readable storage medium, when instructions in the storage medium are executed by the processor of a mobile terminal, the mobile terminal is caused to perform a method for displaying a message, including: determining one or more screened messages; receiving a first instruction for triggering a display page to present one or more new messages, and determining one or more to-be-presented messages according to the first instruction; determining a first message of one or more to-be-presented messages as a target message, and deciding whether the target message is a screened message; and sliding the target message out of the display page if it is decided that the target message is a screened message.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a message, which is implemented by a terminal or a server, the method comprising:
   determining one or more screened messages;
   receiving a first instruction which triggers a display page to present one or more new messages, and determining one or more messages included in the one or more new messages as to-be-presented messages according to the first instruction;
   determining a first message of one or more to-be-presented messages as a target message, and deciding whether the target message is the screened message;
   displaying the to-be-presented messages; and
   sliding the target message out of the display page automatically if it is decided that the target message is the screened message;
   wherein after the target message is slid out of the display page, the method further comprises:
   receiving a second instruction for triggering the display page to present one or more new messages;
   deciding that a sliding direction on the display page of the second instruction is opposite to a sliding direction on the display page of the first instruction;
   deciding that a time interval between the second instruction and the first instruction is within a preset threshold in response to deciding that the sliding direction on the display page of the second instruction is opposite to the sliding direction on the display page of the first instruction; and
   displaying the target message on the display page in response to deciding that the time interval between the second instruction and the first instruction is within the preset threshold.

2. The method of claim 1, wherein the method further comprises:
   updating a second message of one or more to-be-presented messages to be the target message;
   deciding whether the target message is the screened message; and
   presenting the target message on the display page if it is decided that the target message is not the screened message.

3. The method of claim 1, wherein determining one or more screened messages comprises:
   determining the displayed message as the screened message if it is recognized a preset operation performed on a message displayed on a current display page.

4. The method of claim 3, wherein determining the displayed message as the screened message comprises:
   storing an identification of the displayed message in a preset screened-message list.

5. The method of claim 3, wherein the preset operation comprises at least one of the following operations: hovering on the displayed message for a time period exceeding a preset threshold, clicking a preset button, and sliding along a preset track.

6. The method of claim 1, wherein determining one or more screened messages comprises:
counting a reading frequency or a reading time duration of a user with respect to each preset type of messages; and
determining a type of message which has a reading frequency or a reading time duration less than a preset threshold as a screened message.

7. The method of claim 6, wherein determining the message as a screened message comprises:
storing an identification of the message in a preset screened-message list.

8. The method of claim 1, wherein sliding the target message out of the display page if it is decided that the target message is a screened message, comprises:
sliding the target message upward and out of the display page if it is decided that the target message is a screened message and the first instruction is an upward sliding on the display page; and
sliding the target message downward and out of the display page if it is decided that the target message is a screened message and the first instruction is a downward sliding on the display page.

9. A device for displaying a message, comprising:
a processor; and
a memory for storing instructions executable by the processor;
wherein the processor is configured to perform:
determining one or more screened messages;
receiving a first instruction which triggers a display page to present one or more new messages, and determining one or more messages included in the one or more new messages as to-be-presented messages according to the first instruction;
determining a first message of one or more to-be-presented messages as a target message, and deciding whether the target message is a screened message;
displaying the to-be-presented messages; and
sliding the target message out of the display page automatically if it is decided that the target message is a screened message;
wherein after the target message is slid out of the display page, the processor is further configured to perform:
receiving a second instruction for triggering the display page to present one or more new messages;
deciding whether a sliding direction on the display page of the second instruction is opposite to a sliding direction on the display page of the first instruction;
deciding whether a time interval between the second instruction and the first instruction is within a preset threshold if it is decided that the sliding direction on the display page of the second instruction is opposite to the sliding direction on the display page of the first instruction; and
displaying the target message on the display page if it is decided that the time interval between the second instruction and the first instruction is within the preset threshold.

10. The device of claim 9, wherein the processor is configured to perform:
updating a second message of one or more to-be-presented messages to be the target message;
deciding whether the target message is a screened message; and
presenting the target message on the display page if it is decided that the target message is not a screened message.

11. The device of claim 9, wherein determining one or more screened messages comprises:
determining the displayed message as a screened message if it is recognized a preset operation performed on a message displayed on a current display page.

12. The device of claim 11, wherein determining the displayed message as a screened message comprises:
storing an identification of the displayed message in a preset screened-message list.

13. The device of claim 11, wherein the preset operation comprises at least one of the following operations: hovering on the displayed message for a time period exceeding a preset threshold, clicking a preset button, and sliding along a preset track.

14. The device of claim 9, wherein determining one or more screened messages comprises:
counting a reading frequency or a reading time duration of a user with respect to each preset type of messages; and
determining a type of message which has a reading frequency or a reading time duration less than a preset threshold as a screened message.

15. The device of claim 14, wherein determining the message as a screened message comprises:
storing an identification of the message in a preset screened-message list.

16. The device of claim 9, wherein sliding the target message out of the display page if it is decided that the target message is a screened message, comprises:
sliding the target message upward and out of the display page if it is decided that the target message is a screened message and the first instruction is an upward sliding on the display page; and
sliding the target message downward and out of the display page if it is decided that the target message is a screened message and the first instruction is a downward sliding on the display page.

17. A non-transitory computer-readable storage medium having stored therein instructions that, when executed by a processor of a terminal or a sever, causes the terminal or the sever to perform a method for displaying a message, the method comprising:
determining one or more screened messages;
receiving a first instruction which triggers a display page to present one or more new messages, and determining one or more messages included in the one or more new messages as to-be-presented messages according to the first instruction;
determining a first message of one or more to-be-presented messages as a target message, and deciding whether the target message is a screened message;
displaying the to-be-presented messages; and
sliding the target message out of the display page automatically if it is decided that the target message is a screened message;
wherein after the target message is slid out of the display page, the method further comprises:
receiving a second instruction for triggering the display page to present one or more new messages;
deciding whether a sliding direction on the display page of the second instruction is opposite to a sliding direction on the display page of the first instruction;

deciding whether a time interval between the second instruction and the first instruction is within a preset threshold if it is decided that the sliding direction on the display page of the second instruction is opposite to the sliding direction on the display page of the first instruction; and displaying the target message on the display page if it is decided that the time interval between the second instruction and the first instruction is within the preset threshold.

* * * * *